F. D. HOWE.
ENGINE.
APPLICATION FILED MAR. 16, 1908.
908,570.
Patented Jan. 5, 1909.
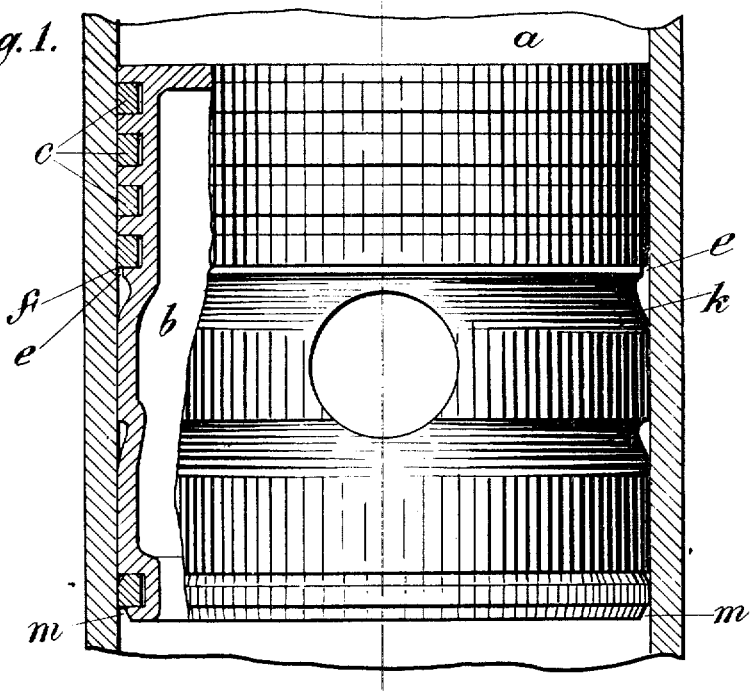
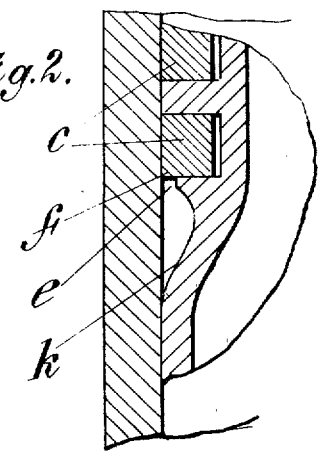
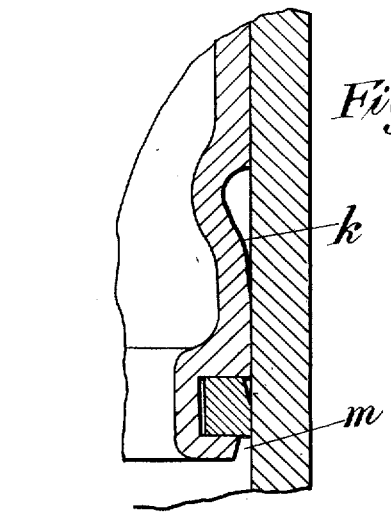
WITNESSES:
M. Rollins
C. Damm
INVENTOR.
Frank D. Howe
BY
Liddle Wendell & Narey
ATTORNEYS

UNITED STATES PATENT OFFICE.

FRANK D. HOWE, OF WALTHAM, MASSACHUSETTS.

ENGINE.

No. 908,570.　　　　Specification of Letters Patent.　　　　Patented Jan. 5, 1909.

Application filed March 16, 1908. Serial No. 421,439.

*To all whom it may concern:*

Be it known that I, FRANK D. HOWE, a citizen of the United States, residing at the present time in the city of Waltham, in the State of Massachusetts, have invented certain new and useful Improvements in Engines, of which the following is a specification, reference being had to the accompanying drawing, forming a part hereof.

The invention relates more particularly to means for preventing the creeping of lubricating oil around the piston into the working chamber; it being especially desirable, in internal combustion engines for instance, to prevent the carbonization of the lubricating oil which takes place when such oil is subjected to the high heat of the combustion chamber, attacking the ignition apparatus and making a frequent overhauling necessary.

It has been proposed heretofore to prevent the creeping of this oil around the piston by providing an annular recess in the surface of the piston and relief channels for the recess leading into the interior of the piston whence the oil collected in the recess might find its way back again to the source of lubrication. The present improvements have to do with the provision of a different form of relief which is much simpler in its construction and which does not involve the removal of the oil from the surface of the piston. This relief is formed in the surface of the piston itself or in one of the piston rings and will be explained in more detail hereinafter with reference to the accompanying drawings in which, Figure 1 is a view partly in elevation of a sufficient portion of a cylinder and a piston to enable the invention to be understood. Fig. 2 is a detail sectional view upon a larger scale, and, Fig. 3 is another detail sectional view.

The working cylinder or the combustion chamber of the engine is indicated by the letter *a* and the piston, which as illustrated is of the ordinary hollow variety, by the letter *b*, being provided as usual, with elastic packing rings *c* located in suitable recesses in the surface of the piston. One of the packing rings, as will be seen from Figs. 1 and 2, is provided with a sharp edge *f* facing the forward end of the piston and adjacent to this edge is a recess *e*. In the operation of the engine, as the piston moves forward the lubricating oil upon the sides of the cylinder will be scraped by the sharp edge *f* into the recess *e*, thus forcing into this recess a relatively large amount of oil which would otherwise remain upon the surface of the cylinder and gradually work its way into the combustion chamber or working cylinder. It is immaterial so far as the present invention is concerned whether the sharp surface *f* be formed upon a piston ring or upon the surface of the cylinder itself. It is preferable, however, to provide this sharp edge upon the ring, as shown, for the reason that the ring is elastic and is in much closer contact with the surface of the cylinder than the surface of the piston whereby the scraping of the oil is much more effective.

The forward end of the recess *e* is rounded as indicated at *k* so that it approaches the surface of the cylinder very gradually. In this way as the piston moves backward into the cylinder the oil which has been scraped by the forward movement of the piston into the recess *e* is gradually re-distributed in a thin film upon the sides of the cylinder again, and is not discharged, as heretofore, into the interior of the piston.

Where elastic rings are employed to scrape the oil, it will be advantageous in some cases, to bevel the rear edge of the ring, as illustrated in Fig. 3, in order to prevent any scraping of the oil as the ring moves backwardly with the piston. Such beveling allows the ring to ride over the film of oil which otherwise would be more or less carried along by the ring. It is also preferable to provide a ring in the forward end of the piston, as shown in Figs. 1 and 3, and where this is done the coöperating recess *m* may be left with one edge open, this recess being formed at the extreme end of the piston. The other edge of the recess is obviously formed by the ring itself. It is understood that this recess of course is a substantial one and not a capillary recess such as would ordinarily exist between the piston and the cylinder walls.

I claim as my invention:—

1. In an engine, the combination with the engine cylinder, of a piston having a sharp edge for the scraping of oil, a recess adjacent to the edge, and a relief for the oil in the recess, said relief being formed upon the surface of the piston and communicating with the recess.

2. In an engine, the combination with the engine cylinder, of a piston having a sharp edge for the scraping of oil, and a recess adjacent to the edge and gradually approaching at its forward end the sides of the cylinder whereby upon the backward stroke of the piston the oil in the recess may be distributed upon the sides of the cylinder as described.

3. In an engine, the combination with the engine cylinder, of a piston having a sharp edge for the scraping of oil, and a recess adjacent to the edge and having its forward edge rounded whereby upon the backward stroke of the piston the oil in the recess may be distributed upon the sides of the cylinder as described.

4. In an engine, the combination with the engine cylinder, of a piston provided with an elastic ring for the scraping of oil, and a recess adjacent to the ring, whereby upon the backward stroke of the piston the oil in the recess may be distributed upon the sides of the cylinder as described.

5. In an engine, the combination with the engine cylinder, of a piston having an elastic ring in the forward end thereof, and a recess at the extreme end of the cylinder in advance of the ring, the ring forming one edge of the recess and the other edge of the recess being open.

6. In an engine, the combination with the engine cylinder, of a piston having an elastic ring, one edge of the ring having a beveled surface and the other edge being sharp.

This specification signed and witnessed this 9th day of March, A. D., 1908.

FRANK D. HOWE.

Signed in the presence of—
  LUCIUS E. VARNEY,
  HOMER H. SNOW.